US011875389B2

(12) United States Patent
Chalkley et al.

(10) Patent No.: US 11,875,389 B2
(45) Date of Patent: *Jan. 16, 2024

(54) AUTO POSTING SYSTEM

(71) Applicant: eBay Inc., San Jose, CA (US)

(72) Inventors: Andrew Chalkley, San Jose, CA (US);
Robinson Piramuthu, Oakland, CA (US); Bindia Saraf, Sunnyvale, CA (US); Qiaosong Wang, San Jose, CA (US)

(73) Assignee: eBay Inc., San Jose, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/321,698

(22) Filed: May 17, 2021

(65) Prior Publication Data

US 2021/0272171 A1 Sep. 2, 2021

Related U.S. Application Data

(63) Continuation of application No. 16/582,604, filed on Sep. 25, 2019, now Pat. No. 11,023,938.

(51) Int. Cl.
*G06Q 50/28* (2012.01)
*G01S 17/89* (2020.01)
*H04N 23/69* (2023.01)
*H04N 23/90* (2023.01)
*H04N 23/695* (2023.01)
(Continued)

(52) U.S. Cl.
CPC ........ *G06Q 30/0603* (2013.01); *B25J 9/1656* (2013.01); *G01S 17/89* (2013.01);
(Continued)

(58) Field of Classification Search
CPC ............... G06Q 30/0603; G06Q 50/28; H04N 5/23299; H04N 5/23296; H04N 5/247;
(Continued)

(56) References Cited

U.S. PATENT DOCUMENTS 7,206,753 B2 4/2007 Bancroft et al.
9,367,770 B2 6/2016 Footen
(Continued)

FOREIGN PATENT DOCUMENTS

| CN | 109716368 | 2/2015 |
|---|---|---|
| CN | 105474199 | 4/2016 |
| WO | 2019/023704 A1 | 1/2019 |

OTHER PUBLICATIONS

Final Office Action Received for U.S. Appl. No. 16/582,604, dated Oct. 5, 2020, 47 Pages.
(Continued)

*Primary Examiner* — Thai Q Tran
*Assistant Examiner* — Jose M Mesa
(74) *Attorney, Agent, or Firm* — FIG. 1 Patents

(57) ABSTRACT

The disclosed technologies include a robotic selling assistant that receives an item from a seller, automatically generates a posting describing the item for sale, stores the item until it is sold, and delivers or sends the item out for delivery. The item is placed in a compartment that uses one or more sensors to identify the item, retrieve supplemental information about the item, and take pictures of the item for inclusion in the posting. A seller-supplied description of the item may be verified based on the retrieved supplemental information, preventing mislabeled items from being sold.

20 Claims, 11 Drawing Sheets

(51) Int. Cl.
*G06Q 30/0601* (2023.01)
*B25J 9/16* (2006.01)
*G06T 7/00* (2017.01)
G06K 19/06 (2006.01)
G05D 1/02 (2020.01)
G05D 1/10 (2006.01)

(52) U.S. Cl.
CPC .......... *G06Q 50/28* (2013.01); *G06T 7/0002* (2013.01); *H04N 23/69* (2023.01); *H04N 23/695* (2023.01); *H04N 23/90* (2023.01); *G05D 1/0276* (2013.01); *G05D 1/101* (2013.01); *G06K 19/06028* (2013.01); *G06T 2207/10048* (2013.01)

(58) Field of Classification Search
CPC ..... H04N 5/2251; G01S 3/7864; G01S 17/89; G08B 13/19608; G06T 7/20; G06T 7/0002; G06T 2207/10048; B25J 9/1656; G02B 15/14; G03B 5/00; G05D 1/0276; G05D 1/0287; G05D 1/101; G08G 1/00; B60K 31/0058; G06K 19/06028
See application file for complete search history.

(56) References Cited

U.S. PATENT DOCUMENTS

| | | | |
|---|---|---|---|
| 10,233,021 B1 | 3/2019 | Brady et al. | |
| 10,310,500 B1* | 6/2019 | Brady | G05D 1/0291 |
| 11,023,938 B2 | 6/2021 | Chalkley et al. | |
| 11,301,984 B1* | 4/2022 | Kumar | G06T 7/0008 |
| 2006/0261157 A1* | 11/2006 | Ostrowski | G06K 9/00 235/383 |
| 2013/0218799 A1* | 8/2013 | Lehmann | G06Q 10/083 705/337 |
| 2015/0058150 A1 | 2/2015 | Gura et al. | |
| 2016/0132840 A1 | 5/2016 | Bowles et al. | |
| 2018/0024554 A1* | 1/2018 | Brady | G06Q 10/0833 701/23 |
| 2018/0297266 A1* | 10/2018 | Linnell | B29C 51/30 |
| 2019/0073631 A1 | 3/2019 | Ferguson et al. | |
| 2019/0217477 A1* | 7/2019 | Paepcke | G06Q 30/06 |
| 2019/0241298 A1* | 8/2019 | Brooks | A47F 9/04 |
| 2020/0148232 A1* | 5/2020 | Morrison | G05D 1/0219 |
| 2021/0090143 A1 | 3/2021 | Chalkley et al. | |

OTHER PUBLICATIONS

Non Final Office Action Received for U.S. Appl. No. 16/582,604, dated Jun. 12, 2020, 23 pages.
Notice of Allowance Received for U.S. Appl. No. 16/582,604, dated Jan. 29, 2021, 5 pages.
202011007801.2, "Foreign Office Action", CN Application No. 202011007801.2, dated Oct. 30, 2023, 22 pages (Official Copy Only).

* cited by examiner

AUTO POSTING SYSTEM

RELATED APPLICATIONS

This application is a continuation of and claims priority to U.S. patent application Ser. No. 16/582,604, filed Sep. 25, 2019, entitled "Auto Posting System", the entire disclosure of which is hereby incorporated by reference herein in its entirety.

BACKGROUND

Every year, hundreds of billions of dollars are spent on online purchases. While the ubiquity of the Internet and reductions in shipping costs have increased online sales, many aspects of online selling remain tedious and time-consuming. For example, creating a posting that lists an item for sale requires describing the item, taking pictures of the item, identifying the manufacturer, model, and production year, evaluating the condition of the item, and estimating shipping costs. These tasks are particularly burdensome to individual sellers and sellers of used items, as the time and expense cannot be recouped with high volume sales. Other challenges to online sales include storing items until they are sold, determining how to package items, and transporting the packaged items to a delivery service. As a result, many items that would otherwise be sold are kept in storage or simply thrown away. Of those that do sell, low quality postings can often depress prices, leaving the seller and the online sales platform worse off.

Another issue confronting online sellers, and the platforms they operate on, are inaccurate postings. A seller may, intentionally or unintentionally, mislabel an item, mis-represent the condition of the item, mis-represent the functionality of the item, etc. Inaccurate postings, whether accidental or intentional, hurt the reputations of sellers and the online sales platform.

It is with respect to these and other technical considerations that the disclosure made herein is presented.

SUMMARY

A robotic auto posting system is provided and described herein. In one embodiment, a robotic selling assistant receives an item from a seller, automatically generates a posting describing the item, stores the item until it is sold, and sends the item out for delivery. The robotic selling assistant may be an autonomous vehicle that drives to the item, picks the item up, and places the item into a posting compartment. The posting compartment may include a number of sensors and electronic devices used to identify the item, verify the item is what the seller claims it is, and generate a posting describing the item. Once the item is sold, the robotic selling assistant may give the item to a package delivery company or deliver the item directly to the purchaser.

The robotic selling assistant may use cameras to capture images of the item for inclusion in the posting. A robotic item manipulation arm and/or turntable may lift, rotate, or otherwise manipulate the item to expose different perspectives to a camera. A three-dimensional rendering of the item may be created by capturing a series of images as the item rotates on a turntable, or as one or more cameras rotate about the item. The quality of the posting is improved by including a number of images from various perspectives.

Images may also be used to identify the item. The robotic selling assistant may identify a barcode, QR code, make, model, serial number, or other identifying information from an image of the item. In other embodiments, the robotic selling assistant may use a machine learning based image recognition system to identify the item.

The identity of the item may be used to generate a description for inclusion in the posting. Identifying information may be directly included in the description. Identifying information may also be used to retrieve a description, user manual, or other more detailed information about the item for inclusion in the posting.

The identity of the item may also be used to confirm a description of the item provided by the seller. If the identity of the item does not match the description provided by the seller, the robotic selling assistant may alert the seller to the discrepancy. The robotic selling assistant may also ask the seller whether or not to continue the sale, or whether the item should be returned to the seller. If the robotic selling assistant determines the seller has intentionally mis-described the item, the robotic selling assistant may alert the online sales platform of potentially fraudulent activity.

In some embodiments, the robotic selling assistant may determine a weight and one or more dimensions of the item. Weight may be determined from a scale, while dimensions may be determined based on a 3-D model or laser-based measurements. Weight and dimensions of the item may be included in the posting as part of the item description, used to estimate dimensions and amounts of packing materials suitable for the item, used to estimate shipping costs, and/or used to verify the seller-provided description of the item.

In some embodiments, the robotic selling assistant includes a robotic arm that creates a customized package to fit the measured dimensions. The customized package may be made from one or more materials such as cardboard, plastic, bubble wrap, or paper, and may take the form of a box, bubble-wrap envelope, tube, flat envelope, or the like. For example, the robotic selling assistant may cut and fold boxes, construct a cardboard tube, cut and fold a bubble-wrap envelop, or otherwise construct the customized package to fit the measured dimensions of the item.

The robotic arm is not limited to shapes such as cylinders or rectangular solids, but may construct custom shapes that conform to the shape of the item based on the 3-D model. Conformal packaging may reduce the material costs of the package. Conformal packaging may also reduce the volume of the package, which may reduce storage and shipping costs.

Before packaging the item with the customized package, the robotic selling assistant may apply protective padding to the item. For example, the robotic selling assistant may dispense and/or apply special wrapping or packaging, such as bubble wrap, paper, or form, for items identified as fragile. The amount of special wrapping applied may be based on the measured dimensions of the item, the 3-D model, a determined fragility of the item, etc. An item may be identified as fragile based on a determination of a material used to manufacture the item, dimensions of the item, historical rates of damage to similar items, etc. Padding may add to the size of the item, and so the robotic selling assistant may incorporate the increased size of the item when constructing custom packaging.

Additional sensors may be used to determine a condition of the item. Infrared sensors, ultraviolet light sensors, light intensity sensors, and the like, may be used to determine whether an item has been damaged prior to receipt, or the extent to which an item is worn. For example, hyperspectral imaging can use light beyond the normal human visual range to infer an age of an item. A microphone may be used to determine if an item rattles unexpectedly when moved. A sensor that measures the intensity of light, in combination with a camera, may be used to determine if an item is scuffed or dirty.

The robotic selling assistant may also include computing device interfaces to identify and evaluate the condition of electronics. For example, the robotic selling assistant may plug a Universal Serial Bus (USB) cable into an item to verify the identity of the item. The robotic selling assistant may also use a Bluetooth, Wi-Fi, or other wireless connection to connect to and determine the identity of the item. Furthermore, the robotic selling assistant may utilize the computing device interface to determine attributes of the item that are not evident from an image, serial number, or other external identifying information. For example, the robotic selling assistant may use a USB connection to determine a capacity of a storage device within the electronic item.

By performing many of the tasks of selling an item, the robotic selling assistant reduces the overhead incurred by a seller. This increases the number of items it is worthwhile for the seller to sell. By generating a more thorough posting, including pictures, identifying information, and a thorough description, the robotic selling assistant may improve sales volume and gross margins. By retrieving and storing the item to be sold, the robotic selling assistant relieves the seller of storage costs, further increasing the number of items it is worthwhile to sell. And by ensuring postings are accurate, the reputations of sellers and the online sales platform are improved.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

The following Detailed Description presents technologies for an autonomous vehicle that receives an item and automatically generates a posting that describes the item. In various embodiments, one or more sensors in conjunction with robotic arms or turntables are used to identify the item. Once identified, the robotic selling assistant may retrieve supplemental information about the item, generate a posting describing the item, store the item, and/or move the item to a warehouse until the item is sold. The robotic selling assistant may also package the item, deliver the item to the purchaser, and/or transport the item to a delivery service to be delivered to the purchaser.

The disclosed technologies can enhance the functionality and efficiency of item identification and description. As just one example, by correctly identifying items and generating a complete and accurate description of those items, items may sell faster, reducing the amount of computing resources required to sell them. At the same time, purchasers may expend fewer computing resources to locate a desired item when that item has been described completely and accurately using the disclosed technologies. As such, the disclosed technologies improve the performance and efficiency of computing devices.

The disclosed technologies can also improve detection of mislabeled or counterfeit items. Correctly identifying an item also allows for more efficient packaging. Technical benefits other than those specifically mentioned herein might also be realized through implementations of the disclosed technologies.

It is to be appreciated that while the technologies disclosed herein are primarily described in the context of online sales, the technologies described herein can also be utilized to identify, describe, package, and/or deliver items in other contexts, which will be apparent to those of skill in the art.

Referring to the appended drawings, in which like numerals represent like elements throughout the several FIGURES, aspects of various technologies for an auto posting system will be described. In the following detailed description, references are made to the accompanying drawings that form a part hereof, and which are shown by way of illustration specific configurations or examples.

Figure 1A:
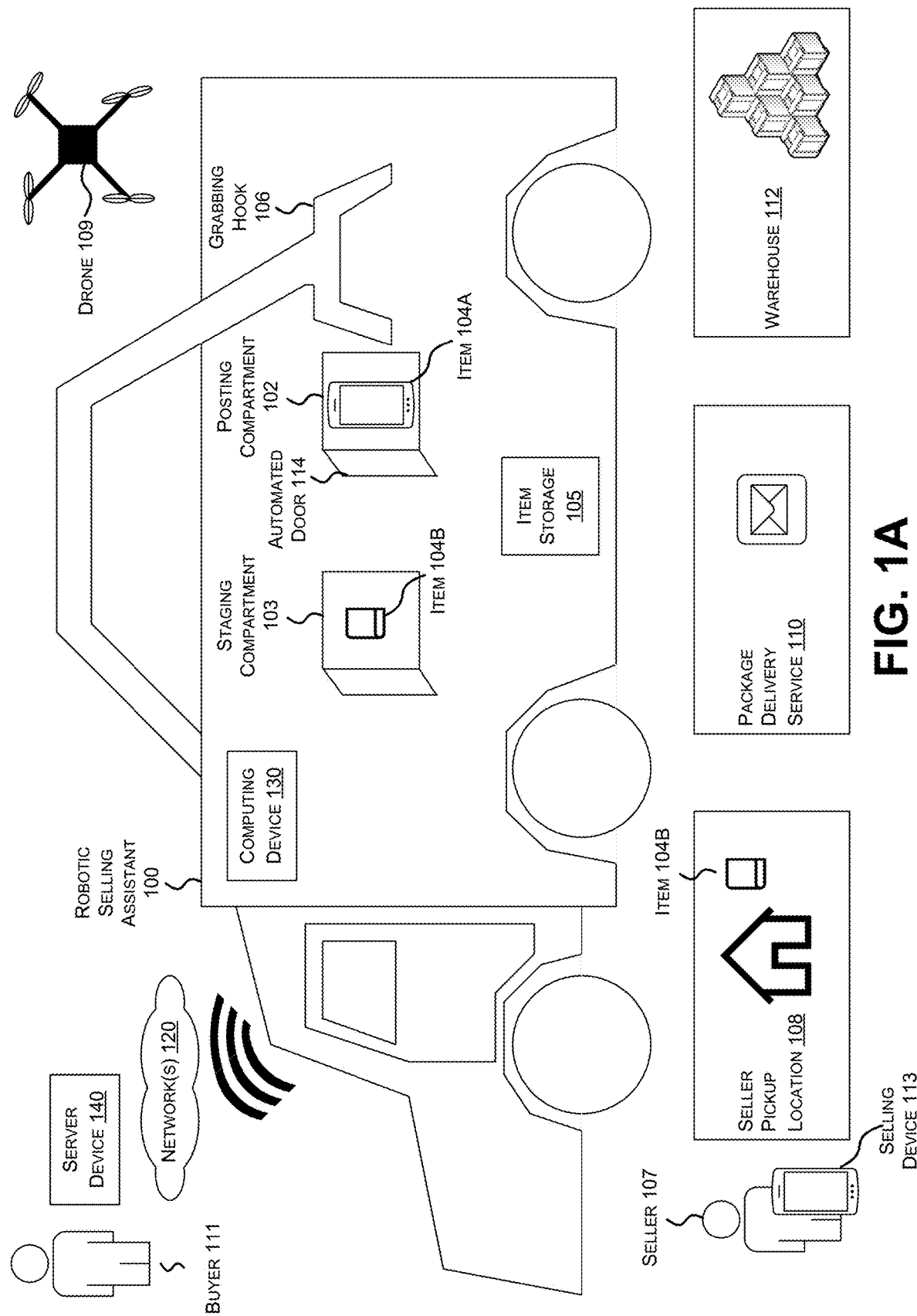
FIG. 1A is a system diagram of an exemplary robotic selling assistant.

In FIG. 1A, a robotic selling assistant 100 is illustrated that implements the auto posting system. In some embodiments, a seller 107 of an item 104 requests that the robotic selling assistant 100 perform some or all of the steps used to sell the item 104, such as retrieving item 104 from a seller designated pickup location 108, generating a posting that describes item 104 and indicates it is for sale, storing item 104 until it is sold, packaging item 104, and/or providing item 104 to a package delivery service 110 for delivery to a purchaser. Seller 107 may request some or all of these actions with selling device 113, which may be a smartphone, tablet, laptop, or other computing device. For example, seller 107 may use selling device 113, or an application running on selling device 112, to take a picture of item 104, write a description of item 104, set seller designated pickup location 108, and/or request a pickup of item 104 at seller designated pickup location 108.

In some embodiments, robotic selling assistant 100 may be an autonomous vehicle capable of driving to a seller designated pickup location 108 (also referred to as "pickup location 108"). In other embodiments, robotic selling assistant 100 may be a portable unit that is trailered to the seller designated pickup location 108. In still other embodiments, robotic selling assistant 100 may be a drone 109 or other unmanned aerial vehicle capable of flying to the seller designated pickup location 108. In some embodiments, seller 107 sets the designated pickup location 108 and requests a pickup using selling device 113. However, robotic selling assistant 100 need not be mobile at all, but may be permanently located in a store, mall, or other convenient location, in which case seller 107 may bring items 104 at least part of the way to the robotic selling assistant 100 for processing.

While FIG. 1 depicts robotic selling assistant 100 as a single vehicle, different functional aspects of robotic selling assistant 100 may be performed by different vehicles. For example, robotic selling assistant 100 may be a stationary unit, e.g. located in a shopping mall. A retrieval vehicle 101 (not shown in FIG. 1A) with a grabbing hook 106 may work in conjunction with robotic selling assistant 100. Retrieval vehicle 101 may be a truck, car, or other vehicle that works with robotic selling assistant 100. Retrieval vehicle 101 may be dispatched to a seller designated pickup location 108 to retrieve items 104 for processing by robotic selling assistant 100. Retrieval vehicle 101 may then meet-up with robotic selling assistant 100 and use grabbing hook 106 to place the retrieved item 104 into posting compartment 102. In another embodiment one or more drones 109 may work in conjunction with robotic selling assistant 100. When robotic selling assistant 100 is stationary, drones 109 may retrieve items 104 from seller designated pickup locations 108. For example, drones 109 may retrieve items 104 from a seller designated pickup location 108 in a mall parking lot. In another embodiment, robotic selling assistant 100, or retrieval vehicle 101, may be outfitted with one or more drones 109. Such a mobile robotic selling assistant 100 may drive through a neighborhood, dispatching drones 109 to retrieve items 104 from seller designated pickup locations 108.

Robotic selling assistant 100 includes one or more posting compartments 102, into which an item 104 may be placed for processing. In some embodiments, item 104 is placed in posting compartment 102 by a seller 107, while in other embodiments, grabbing hook 106 or drone 109 retrieves item 104 and places it into posting compartment 102. Seller 107 may gain access to posting compartment 102 through automated door 114. Automated door 114 may be secured by a password, security token, biometric scanner, or other security credential ensuring that only authorized people are able to access posting compartment 102. Posting compartment 102 is described in greater detail below in conjunction with FIG. 2A.

Seller 107 may also use these security credentials to login to the online sales platform. Once logged in, seller 107 may view the posting of item 104, edit, update, or delete the posting.

Figure 2A:
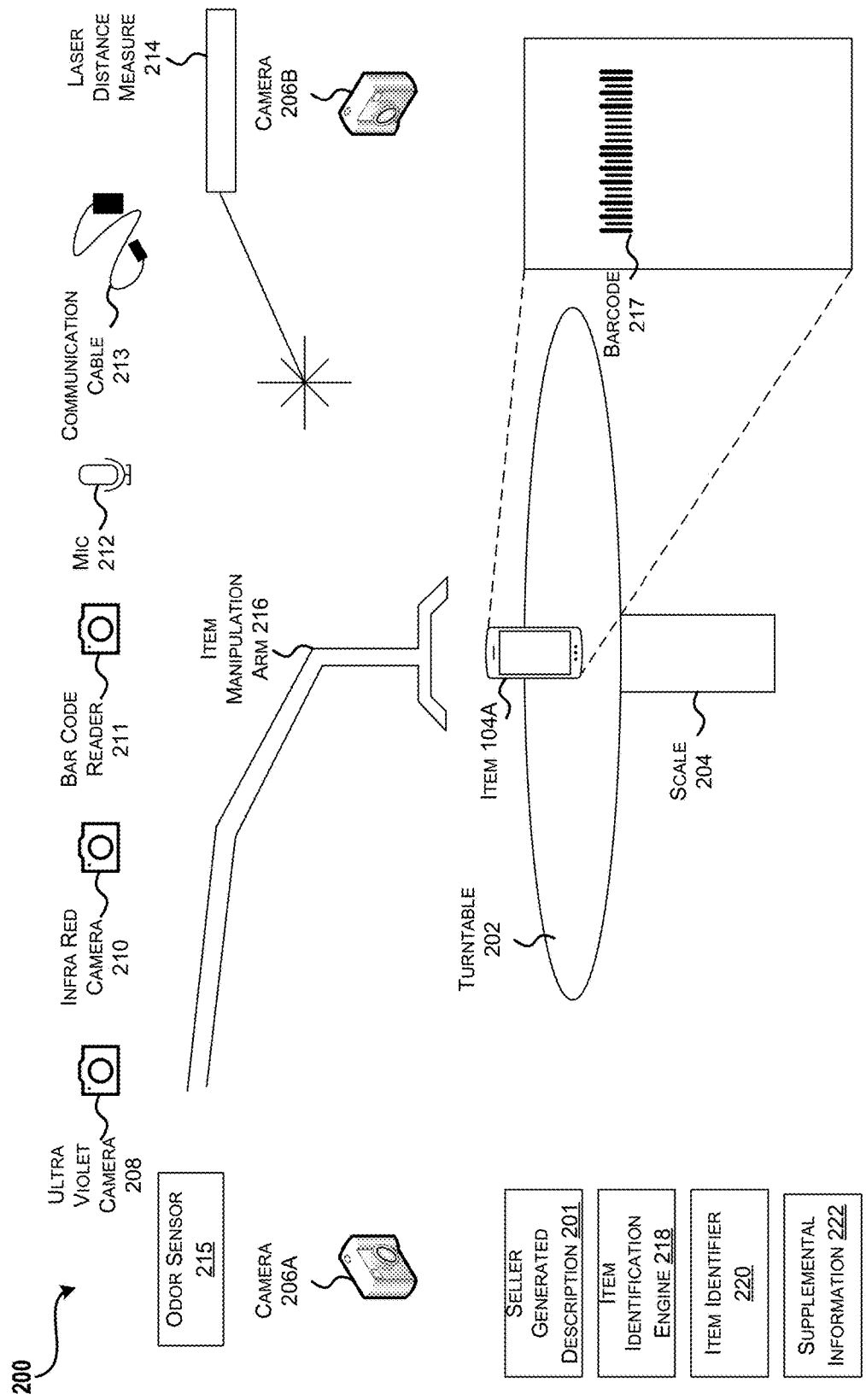
FIG. 2A is a block diagram showing aspects of a posting compartment according to one embodiment disclosed herein.

Once an item 104 has been received by robotic selling assistant 100, robotic selling assistant 100 may generate a posting advertising that the item 104 is for sale. In some embodiments, robotic selling assistant 100 stores item 104 until the item 104 is sold. In other embodiments robotic selling assistant 100 delivers item 104 to a warehouse 112 until the item 104 is sold. At any point while the item 104 is in the custody of robotic selling assistant 100 or warehouse 112, robotic selling assistant 100 may select packing materials usable to package item 104. This selection may be made based on attributes of item 104 measured by posting compartment 102, such as size, weight, condition, fragility, etc. Packaging materials may also be selected based on supplemental information 222 (as shown in FIG. 2A) about item 104, e.g. information derived from a product manual, manufacturer's specifications, or other online source. Robotic selling assistant 100 may identify a fragile item based in part on a material used to manufacture the item. For example, items made of glass, electronic components, or parchment may be considered fragile, while items made of plastic or bound paper may be considered less fragile. The material the item is made of may be determined by one or more of the sensors 204-214, or from an analysis of supplemental information 222. Special packaging, e.g. bubble wrap, rigid containers, etc. may be applied to fragile items in order to lessen the likelihood that a fragile item will be damaged during storage and transit.

In some embodiments, robotic selling assistant 100 includes computing device 130, which may perform instructions included in a memory to implement aspects of the embodiments. Computing device 130 may implement item identification engine 218, described below in conjunction with FIG. 2A, and is described in more detail below in conjunction with FIGS. 6 and 7. Robotic selling assistant 100 may utilize network(s) 120 to communicate with server device 140. Server device 140 may host postings generated by robotic selling assistant 100. Sever device 140 may also make the postings available to potential buyers 111. Robotic selling assistant 100 may also utilize network(s) 120 to retrieve supplemental information 222 about item 104, such as a product description, product manual, etc.

Figure 1B:
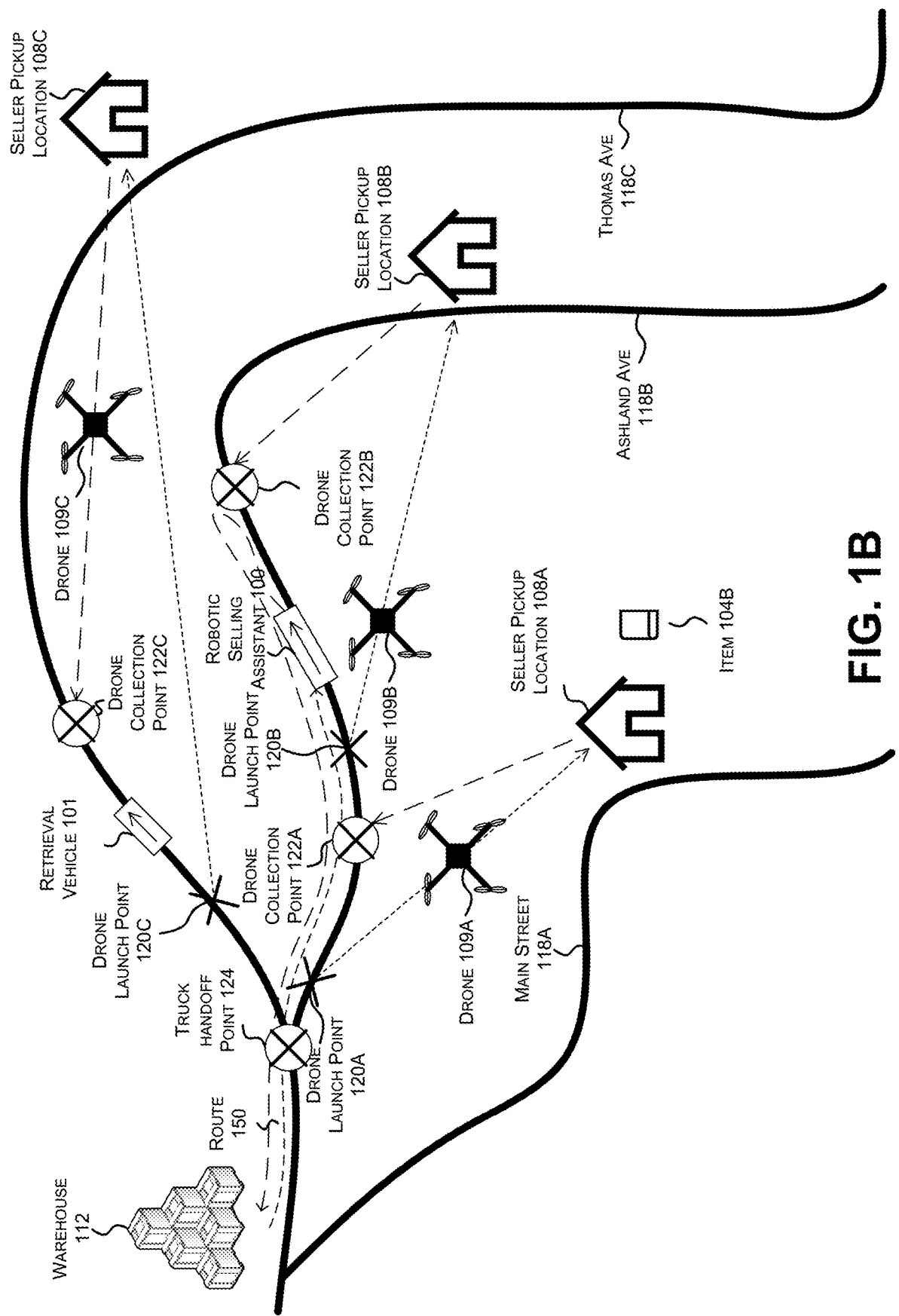
FIG. 1B is a route overview of the exemplary robotic selling assistant.

FIG. 1B illustrates a route overview of the exemplary robotic selling assistant 100. In this example, robotic selling assistant 100 has left warehouse 112 to retrieve items 104 from seller pickup locations 108. In some embodiments, robotic selling assistant 100 works in conjunction with retrieval vehicle 101, which may also retrieve items 104 and/or launch drones 109 to retrieve items 104.

FIG. 1B depicts three streets and three seller pickup locations, one on each street. Seller pickup location 108A is on Main street 118A, seller pickup location 108B is on Ashland Ave 118B, and seller pickup location 108C is on Thomas Ave 118C. Trucks with drones 109 navigating streets 118 to seller pickup locations 108 is one embodiment of the disclosed technologies. However, any type of vehicle, e.g. boat, train, bike, or hovercraft, routed along any type of thoroughfare, e.g. rail line, canal, or air corridor, is similarly contemplated. Furthermore, while FIG. 1B illustrates trucks working in concert with drones, any combination of vehicles is similarly contemplated. For example, cargo ships with runabouts, trains with trucks, etc., or a combination thereof, are similarly contemplated.

FIG. 1B illustrates robotic selling assistant 100 on route 150 to pick up one or more items 104 at seller pickup locations 108A, 108B, and 108C. Robotic selling assistant 100 may plan route 150 based on a number of factors, such as: travel times to each of the seller pickup locations 108 and travel times between each of the seller pickup locations 108. The speed and capacity of vehicles used to pick up and process items are also factors, such as: number of drones 109, drone capacity, number of retrieval vehicles 101, and retrieval vehicle capacity.

Properties of the items being retrieved are also factors in vehicle selection and route planning, such as: the number of items 104 at each pickup location 108, estimated weight and dimensions of items 104, both individually and the total for each pickup location 108, item type—e.g. whether an item is flammable, fragile, of high value, etc. In some embodiments, seller 107 manually enters a description of items 104, including weight, dimensions, flammability, fragility, value, etc. In other embodiments, these properties may be derived from a posting, including pictures, descriptions, descriptions of other postings for similar or identical items 104, product manuals and other information linked from the posting. Vehicle types may be selected for a particular route 150 based on the properties of the items 104 being picked up. Vehicle type may be selected to satisfy individual requirements of the items 104 being picked up, e.g. a vehicle with strong robotic arm may be selected for a route 150 that includes heavy items 104. Vehicle type may also be selected to satisfy the collective requirements of items 104 picked up on the route, e.g. total volume, weight, refrigeration requirements, etc.

Properties of the robotic selling assistant 100 itself are also factors in route planning, including the number and processing speed of posting compartments 102, available item storage capacity 105 for robotic selling assistant 100 to hold processed items 104, and the like. Route 150 may define a path taken by each vehicle, drone launch points 120, drone collection points 122, and a schedule for when items 104 will be processed by posting compartments 102.

For example, travel times may be calculated based on distances between robotic selling assistant 100, retrieval vehicle 101, drones 109, and items 104. For all vehicles, the distance along navigable roads 118 is considered. However, drones may not always be constrained by roads, and so the straight line (i.e. Euclidian) distance may also be considered. Travel time may also be affected by road conditions, weather, traffic, and other impediments. An estimated collection time—i.e. the time it takes for a vehicle to secure item 104 for travel—may also be a factor in travel time as items are picked up along the route.

Route choice may also be affected by the number, weight, size, and type of items 104 at each pickup location 108. The number, weight, size, and type of items to be retrieved may be analyzed in light of drone capacity. Drone capacity may determine, for each drone 109, limits on the weight, size, number, and type (e.g. flammable, delicate, etc.) of items that the drone is able to retrieve, in one or more passes. In some embodiments, drone capacity is compared to item weight, size, and type to determine if a drone is capable of retrieving the item. Individual item weight, size, and type may also be used to determine whether multiple items 104 may be retrieved at the same time in a single pass from a single pickup location, whether multiple items 104 may be retrieved from multiple pickup locations 108 before offloading them, etc. A drone may be unable to retrieve multiple items in a single pass if the items collectively weigh too much or if they collectively require more space than the drone has capacity to carry. Based on these limitations, even if a drone 109 is best positioned to travel to a pickup location 108, a drone 109 may not be capable of retrieving the items at that location, and so it may be more efficient for robotic selling assistant 100 to pick up the items.

However, drones 109 are not limited to single trips to a particular pickup location 108—robotic selling assistant 100 may plan a route in which a drone 109 repeatedly moves items from one or more pickup locations 108 to a staging area. In some embodiments, the staging area is an area that robotic selling assistant 100 or retrieval vehicle 101 will pass by/return to as part of route 150. Items may accumulate at the staging area until robotic selling assistant 100 returns to process them. In this way, a drone 109 that is incapable of retrieving multiple items 104 from a pickup location 108 in the same trip may retrieve multiple items 104 from a pickup location 108 in multiple trips and offload the items 104 to the staging area.

Route 150 may be optimized in a number of ways. Route 150 may be optimized to retrieve items as quickly as possible—i.e. route 150 may be optimized such that items 104 are retrieved and placed into robotic selling assistant 100 in the least amount of time. Additionally, or alternatively, route 150 may be optimized to minimize an energy cost. Route 150 may also be optimized to minimize drone flight time around noise sensitive areas.

In some embodiments, route 150 is optimized to maximize item processing throughput. Robotic selling assistant 100 may have a limited number of posting compartments 102 with which to process items, and so it may be advantageous to plan route 150 such that a steady stream of items are provided to robotic selling assistant 100 to utilize posting compartments 102 at capacity. Maximizing item processing throughput differs from retrieving all items as quickly as possible, as robotic selling assistant 100, retrieval vehicle 101, and drones 109 may be routed to provide posting compartments 102 with items to process early in the route and throughout the route. In contrast, if most or all of the items become available for processing at the end of the route, posting compartments 102 would become backlogged and robotic selling assistant 100 would sit idle while the backlog was processed. By maximizing throughput of posting compartments 102, route 150 may allow robotic selling assistant 100 to eliminate backlog in processing multiple sets of items. In some embodiments, route 150 is optimized such that robotic selling assistant is processing the last item 104 as it returns to warehouse 112, filling item storage 105, at which point processed items 104 may be unloaded and robotic selling assistant 100 may embark on another route 150 to retrieve a new set of items 104.

In some embodiments, route 150 is planned based on the number and capacity of retrieval vehicles 101 working with robotic selling assistant 100. Route 150 may also be planned based on the number and capacity of drones 109 available to robotic selling assistant 100 and retrieval vehicles 101. A rate at which drones may be launched and collected may also be a factor in planning route 150.

As depicted in FIG. 1B, robotic selling assistant 100 has driven down Ashland Ave, and has launched drones 109A and 109B to retrieve items from seller pickup locations 108A and 108B. Drone 109A was launched from drone launch point 120A, and drone 109B was launched from drone launch point 120B. In this example, robotic selling assistant 100 is working in conjunction with retrieval vehicle 101, which launched drone 109C from drone launch point 120C. Each drone 109 flies to the corresponding seller pickup location. While the robotic selling assistant 100 travels along roadways 118, drones 109 may fly above or around obstacles, increasing the effective reach of robotic selling assistant 100, and allowing items 104 to be retrieved in parallel.

In some embodiments, route 150 may identify drone collection points 122 where robotic selling assistant 100 collects drones 109 that have retrieved items 104 from pickup locations 108. For example, drone 109A may meet robotic selling assistant 100 at drone collection point 122A, having retrieved item 104A from seller pickup location 108A. Similarly, drone 109B may meet with robotic selling assistant 100 at drone collection point 122B, while drone 109C may meet with retrieval vehicle 101 at drone collection point 122C. Items collected by retrieval vehicle 101 may be transferred to robotic selling assistant 100 at truck handoff point 124.

Robotic selling assistant 100 may place items in a staging compartment 103 while a posting compartment 102 is made available to process the staged items. Once a posting has been generated for an item by posting compartment 102, the item may be transferred to item storage 105 where it may wait to be offloaded to warehouse 112, delivered to buyer 111, or packaged for transfer to package delivery service 110.

FIG. 2A illustrates a block diagram 200 showing aspects of a posting compartment 102 according to one embodiment disclosed herein. Item 104A, a smart phone in this example, has been placed on top of turntable 202. Item 104A may have been placed on turntable 202 by seller 107, grabbing hook 106 of robotic selling assistant 100, grabbing hook 106 of retrieval vehicle 101, drone 109, or the like. In some embodiments, item manipulation arm 216 places item 104 on turntable 202, or item manipulation arm 216 may center item 104 on turntable 202. In another embodiment, item 104 is placed on a non-turning table, scale 204, or other surface that does not function as a turntable.

Once placed on the turntable 202, item 104 may be analyzed by one or more sensors such as scale 204, camera 206, ultraviolet camera 208, infrared camera 210, bar code reader 211, microphone 212, communication cable 213 (e.g. USB cable), laser distance measure 214, and/or odor sensor 215. Item 104 may be physically manipulated by turntable 202 or item manipulation arm 216 before, during, or after, information about item 104 is derived from one or more of the aforementioned sensors. In this way, item manipulation arm allows the sensors to perceive item 104 from different perspectives.

Scale 204 may be used to determine a weight of item 104. As discussed in more detail below, an item's weight may be used to determine shipping costs, select packaging materials, and detect counterfeit items.

Figure 3A:
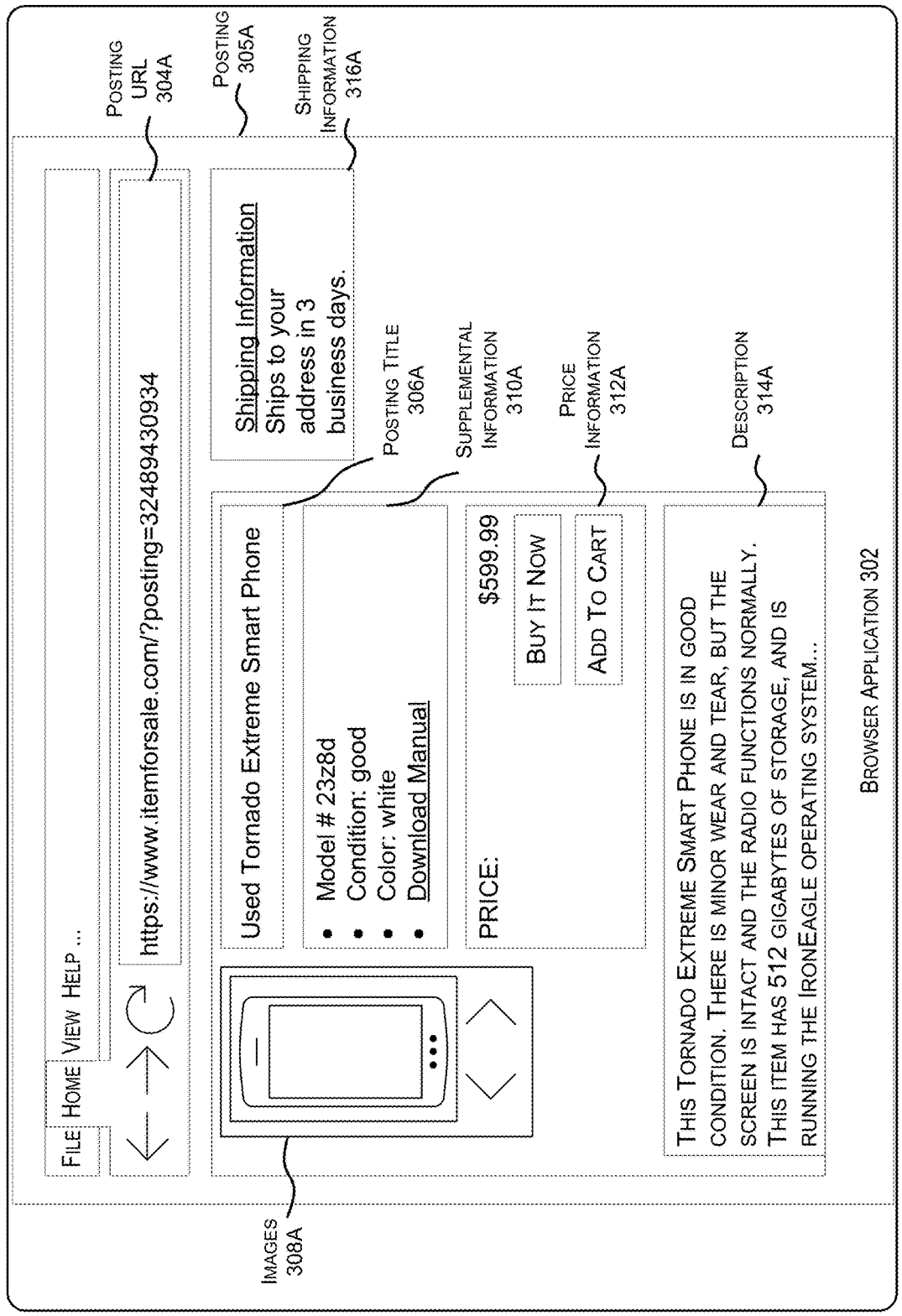
FIG. 3A is a diagram showing aspects of a posting generated by a robotic selling assistant according to one embodiment disclosed herein.

Camera 206 (also referred to herein as a sensor 206) may be any device that captures a still image and/or video. One or more still images and/or videos 308 (as shown in FIG. 3A) may be added to the posting to help potential buyers to assess the item 104 being offered, and to provide assurance to potential buyers of the item's condition. Camera 206 may also capture an intensity value, which may be used to identify wear on item 104. In some embodiments, cameras 206 capture images of item 104 as turntable 202 rotates, ensuring item 104 is photographed from multiple angles. Additionally, or alternatively, item manipulation arm 216 may pick up item 104 and present different perspectives to cameras 206 to generate images from different angles. For example, item manipulation arm 216 allows the portion of item 104 that is resting on turntable 202 to be photographed.

Ultraviolet (UV) camera 208 generates images based on nonvisible light from the ultraviolet spectrum. UV light may be used to determine the condition of the item and/or infer age of the item. For example, scuffed portions of an item may have a distinct pattern in an image captured by UV camera 208. The extent of scuffing on an item may provide a proxy for age and condition of item 104. Age and condition of the item may, in turn, be factors in an estimate of remaining useful life of item 104.

Additionally, or alternatively, UV camera 208 may be used in conjunction with a UV light to capture UV induced florescence. UV induced florescence may identify the presence of physiological fluids such as saliva and urine, as well as mold and other residues left on item 104. The detection of one or more of these residues may be used to update the estimated condition of item 104. The detection of one or more of these residues may also be highlighted in one or more captured images 308 or description 314 (FIG. 3A) of posting 305 (FIG. 3A).

Infrared (IR) camera 210 generates images based on nonvisible light from the infrared spectrum. IR light may be used to estimate temperature of an item, i.e. thermography. In one embodiment, item 104 may have a specified operating temperature range. Robotic selling assistant 100 may turn on item 104 and use infrared camera 210 to measure the temperature of item 104 while it is being used. The measured temperatures may be compared with a specified temperature range, or to temperatures of items comparable to item 104. Deviation from the specified temperature range may be indicated in description 314 of posting 305, and may be used as a factor in determining the condition of item 104. In one embodiment, robotic selling assistant 100 may use communication cable 213 to operate item 104 while testing for overheating. In one embodiment, robotic selling assistant 100 may turn on item 104A using item manipulation arm 216.

IR camera 210 may also be used to detect the presence of water on/in the item, and therefore potential water damage in item 104. For example, IR camera 210 may perceive a lower temperature where water or other liquid is evaporating within item 104. Water damage may be another factor included in determining the condition of item 104.

Camera 206, UV camera 208, IR camera 210, or a combination thereof, may be used in conjunction with image processing algorithms to detect stains on item 104. One image processing algorithm identifies common stains, such as grass, blood, oil, crayon, bleaching, or the like. Another image processing algorithm identifies decorative patterns on item 104, e.g. polka dots, herringbone, or stripes, and then identifies portions of item 104 that deviate from the pattern as a stain. Another image processing algorithm identifies fading, corrosion (e.g. rust), and other forms of wear on item 104. The image processing algorithms may be hand coded, based on machine learning, or a combination thereof. The presence of the stain, including a picture highlighting it, may be included in the posting. The presence of the stain may also be used when estimating a condition of item 104 and/or a suggested price of item 104.

Item manipulation arm 216 may itself be used to test the condition of item 104. For example, item manipulation arm 216 may apply a force to item 104 to determine a flexibility of item 104. Item manipulation arm 216 may apply the force against scale 204 to measure the amount of force applied. In another embodiment, two or more item manipulation arms may be used to push, pull, squeeze, twist, or otherwise apply a force to item 104 to determine physical characteristics, including flexibility, rigidity, firmness, etc.

Camera 206 may measure an amount of pushing, pulling, squeezing, twisting, and other physical deformations caused by one or more item manipulation arms 116. For example, camera 206 may capture an image of item 104 during a flexibility test, and an image processing algorithm may measure the amount of flexibility induced by item manipulation arm 216. Flexibility, rigidity, firmness, etc., may be suggestive of item condition, and therefore price, e.g. some vegetables may be deemed in poor condition if it is flexible, while a metal tube may be deemed in good condition if it is rigid. In some embodiments, the condition of item 104 may be estimated by comparing a measured flexibility value with an expected flexibility value derived from historical measurements of similar items, published specifications of item flexibility, etc.

Odor sensor 215 may be used to determine the condition of item 104. Odor sensor 215 may capture particulate matter given off by item 104 and analyze it chemically or spectrally to identify odors. Odor sensor 215 may identify well known odors, such as perfume, urine, animal smells, smoke (e.g. cigarette smoke), gasoline, charred or burned smells, mold, mildew, or the like. In addition to being factored into the condition of item 104, odors may be added to the posting as part of the description.

Bar code reader 211 may be used to scan a barcode, QR code, or other encoded number that is displayed on item 104. In one embodiment, item identification engine 218 causes bar code reader 211 to scan bar code 217 on item 104 to determine item identifier 220. Robotic selling assistant 100 may in turn use item identifier 220 to query server device 140 for supplemental information related to item 104. The query for supplemental information may utilize wireless network 120 to look up supplemental information from a manufacturer's website, or from any other public data source.

Microphone 212 may be used to record sounds that emanate from item 104. Microphone 212 may be used to determine a volume level of item 104 as it is running. For example, robotic selling assistant 100 may robotically connect communication cable 213 to item 104, or otherwise turn on and operate item 104. Once item 104 has been turned on, microphone 212 may determine if item 104 is running within a specified range of decibels—i.e. within a range of decibels prescribed by the item product manual, manufacturer, etc. Volume levels detected using microphone 212 may also be compared with average volume levels produced by similar items—e.g. items having the same item identifier 220 that a robotic selling assistant had previously measured. Whether or not item 104 is running within a specified range of decibels may be a factor in determining a condition of item 104, e.g. a lower volume may correspond with a better rating. Description 314 of item 104 may include the measured runtime volume in addition to the manufacturer specified volume range.

Microphone 212 may also record audio while item 104 is turning on turntable 202 or being held, shaken, tilted, rotated, or otherwise moved by item manipulation arm 216. Based on supplemental information 222 of item 104, e.g. contents of a product manual, product information retrieved from the manufacturer, etc., robotic selling assistant 100 may determine whether any sound is expected when item 104 is moved. In other embodiments, robotic selling assistant 100 may determine what, if any, sounds are expected by comparison to sounds made by similar items that were previously processed by robotic selling assistant 100. For example, if a robotic selling assistant 100 has received thousands of toys with the same item identifier 220 for sale, and if the robotic selling assistant 100 has measured sounds that emanated from the toys as they are tilted, rotated, or otherwise manipulated by item manipulation arm 216, then robotic selling assistant 100 may determine if a new instance of the particular toy being evaluated produces the expected sounds when manipulated in the same way. If microphone 212 detects unexpected sounds, the condition of item 104 in the description 314 of item 104 may be updated accordingly, and the unexpected sounds may be added to the description of the item. For example, robotic selling assistant 100 may assign a condition of "fair" or "poor" to an item that produces an unexpected sound.

Communication cable 213 may be used to communicatively interface with item 104. Communication cable 213 may be, for example, a universal serial bus (USB) cable, lightning cable, serial cable, 1394 (FireWire®) cable, thunderbolt cable, or the like. For example, robotic selling assistant 100 may turn on item 104 via communication cable 213. Robotic selling assistant 100 may determine item identifier 220 of item 104 by querying system information, operating system information, manufacturer information, etc. Additionally, or alternatively, robotic selling assistant 100 may cause item 104 to perform a system check, the results of which may be included in the description of the posting. In some embodiments, computing device 130 uses login and password information provided by seller 107 to access item 104.

Communication cable 213 may also be used in conjunction with other sensors to perform tests on item 104. Robotic selling assistant 100 may use communication cable 213 to cause item 104 to perform a test during which microphone 212 measures audio output. For example, robotic selling assistant 100 may measure sound levels of an item's cooling fan while the item is under load. Similarly, robotic selling assistant 100 may use communication cable 213 to cause item 104 to perform a test during which infrared camera 210 may measure a temperature of item 104. The results of these tests and others may be included in the description section of the posting.

Communication cable 213 may also be used to identify functionality included in item 104. For example, communication cable 213 may initiate a benchmark test to evaluate speed, latency, and other performance metrics of item 104. Communication cable 213 may also identify features supported by item 104, e.g. software that is included in item 104, software versions, etc. Communication cable 213 may also be used to identify hardware components included in item 104, such as particular display screen dimensions, wireless network interfaces, and the like. Item functionality may be included in the description of the posting, used to estimate a price, etc.

Communication cable 213 may also be used to detect counterfeit devices. For example, computing device 130 may use communication cable 213 to verify a seller-provided description. Robotic selling assistant 100 may plug communication cable 213 into item 104, allowing computing device 130 to scan the internal components of item 104, such as memory, storage, CPU, or the like. The list of internal components may be compared to the list of internal components associated with the seller provided description. For example, if the seller-provided description indicates that a smart phone has 128 gigabytes (GB) of storage, but the internal scan using communication cable 213 indicates that the item actually has 64 gigabytes, the seller and/or the online sales platform may be notified. In another embodiment, the seller-provided description may be excluded, or it may be replaced in the posting with a description generated based on the internal scan.

Communication cable 213 may also be used to detect counterfeit devices that enclose a cheaper, less powerful, or otherwise less functional product within a housing/shell/casing of a more expensive, more powerful, or otherwise more functional product. For example, a computer graphics card may appear to be a late-model, top of the line product from a major graphics card manufacturer, when in fact the internal components are from a dated, less powerful graphics card. Item identification engine 218 may compare an image-based identity with a list of internal components derived from communication cable 213 to determine if the item is authentic or counterfeit.

In other embodiments, computing device 130 may use communication cable 213 to perform a factory reset of item 104. This protects the seller from accidentally exposing personal information contained on item 104 to the public.

Laser distance measure 214 may be used to determine the size of item 104. In one embodiment, laser distance measure 214 is attached to a gimbal and moved up, down, left, right, front, and back relative to item 104. In this way, a distance measure of item 104 may be taken in each of the three spatial dimensions. Additionally, or alternatively, laser distance measure 214 may be rotated around item 104 while maintaining focus on the center of item 104A. In this embodiment, laser distance measure 214 may identify a contour of item 104, i.e. by measuring a distance from laser distance measure 214 to item 104 as item 104 is rotated. In either case, laser distance measure 214 may determine the size of item 104 by recording distances between item 104 and the laser distance measure 214 as the laser distance measure is moved relative to item 104.

In some embodiments, item identification engine 218 uses the sensors contained in posting compartment 102 to identify item 104—i.e. to determine item identifier 220. Item identifier 220 may comprise a unique number, such as a MAC address. Item identifier 220 may also include a product category in conjunction with the unique number, such as the product category "books" in conjunction with an International Standard Book Number (ISBN). In other domains, item identifier may also include make, model, and version information. One of ordinary skill in the art will appreciate that these are examples, and that there are many other ways of uniquely identifying an item.

Once determined, item identifier 220 of item 104 may be used to retrieve supplemental information 222 for item 104. Supplemental information 222 may include make, model, manufacturer, model year, dimensions, weight, color, versions of installed software, a manual, a link to the manufacturer's description, or the like. Supplemental information may also include materials used to construct item 104. By knowing which materials item 104 is made from, robotic selling assistant 100 can better identify worn or broken materials. For example, if supplemental information 222 on smart phone 104 indicates the housing is made of aluminum, UV camera 208 may be configured to identify wear and scuffing of aluminum. However, if supplemental information 222 indicates that item 104 is made of wood, cloth, stainless steel, leather, or any other material, UV camera 208 and other wear-detecting sensors may be calibrated and utilized accordingly.

In one embodiment, this supplemental information may be used to select one or more angles, zoom levels, and distances of camera 206 to obtain relevant and useful photos of item 104. For example, robotic selling assistant 100 may analyze photos included in a product manual to determine a perspective, i.e. angle, zoom level, and distance, of camera 206. Robotic selling assistant 100 may also consider size, weight, and other dimensional aspects of item 104 when determining camera perspective.

In some embodiments, items that have been successfully identified may be scanned for wear, defects, or other aspects specific to that item. The results of these item-specific scans may be included in the item's description or affect an item's condition. In other embodiments, the results of item-specific scans may be used to describe one or more images included in the posting. Item-specific scans may be manually specified by a manufacturer, the online sales platform, or by purchaser feedback.

For example, if item 104 is determined to be a portable computing device such as a smartphone, the online sales platform may have determined that whether the screen is cracked is important to buyers. As such, computing device 130 may analyze images captured by cameras 206 to determine if the item's screen is cracked or otherwise damaged. If evidence of the screen being damaged is found, the item's condition may be downgraded. Furthermore, a picture of the crack may be included in the posting along with a description—e.g. how big is the crack, where it is located, etc.

In one embodiment, robotic selling assistant 100 receives a seller generated description 201 from seller 107. Robotic selling assistant 100 may use supplemental information 222 to determine if the seller generated description 201 is accurate. For example, robotic selling assistant 100 may compare a model number included in the seller generated description 201 to a model number included in supplemental information 222. Similarly, robotic selling assistant 100 may compare a claimed storage capacity to a storage capacity listed in supplemental information 222.

Additionally, or alternatively, robotic selling assistant 100 may determine the accuracy of supplemental information 222 by comparison to measured values. For example, if a product manual included in supplemental information 222 lists an item size and weight, robotic selling assistant 100 may compare the listed size and weight to the size measured by laser distance measure 214 and the weight measured by scale 204. Discrepancies may prevent robotic selling assistant 100 from generating or publishing the posting. Robotic selling assistant 100 may optionally report discrepancies to seller 107 and/or to the company that would publish the posting.

Item identifier 220 may also be used to find postings of similar items—i.e. items that have the same item identifier 220. In other embodiments, similar items may be identified by comparing images of the current item to images from other postings, or by comparing measured values from sensors 204-214 to values measured for other postings. Once identified, similar items may be used to determine pricing information, condition, etc. For example, item identification engine 218 may analyze price data, sensor data, and data derived from images of similar items. Trends, such as a negative correlation between item price and a value range captured by UV camera 208, or a higher price for a particular color of the item, may be used to estimate a fair price for the current item. In another embodiment, a description from postings of similar items may be used to generate the description of the current item.

Figure 2B:
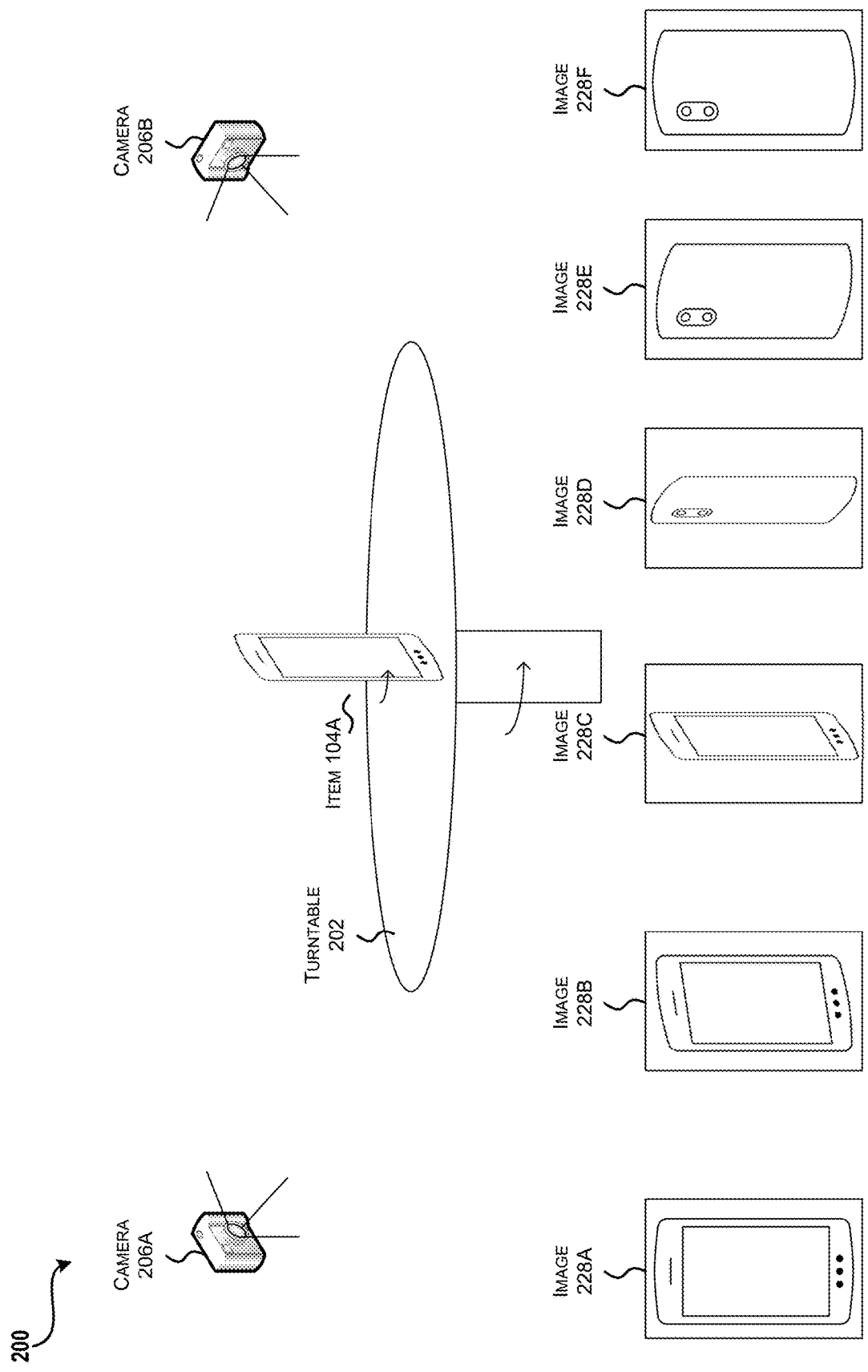
FIG. 2B is a block diagram showing aspects of the posting compartment as images are captured of an item from multiple angles.

FIG. 2B is a block diagram of an example embodiment 200 showing aspects of the posting compartment 102 as images 228A-F (collectively "228") of an item 104A are captured from multiple angles. As depicted, item 104A, a smartphone, rotates counter-clockwise on turntable 202. As it is turning, cameras 206A and 206B capture a series of images 228A-F of item 104A. These images are made available for the posting, giving potential purchasers a clear visual understanding of the item for sale.

Figure 2C:
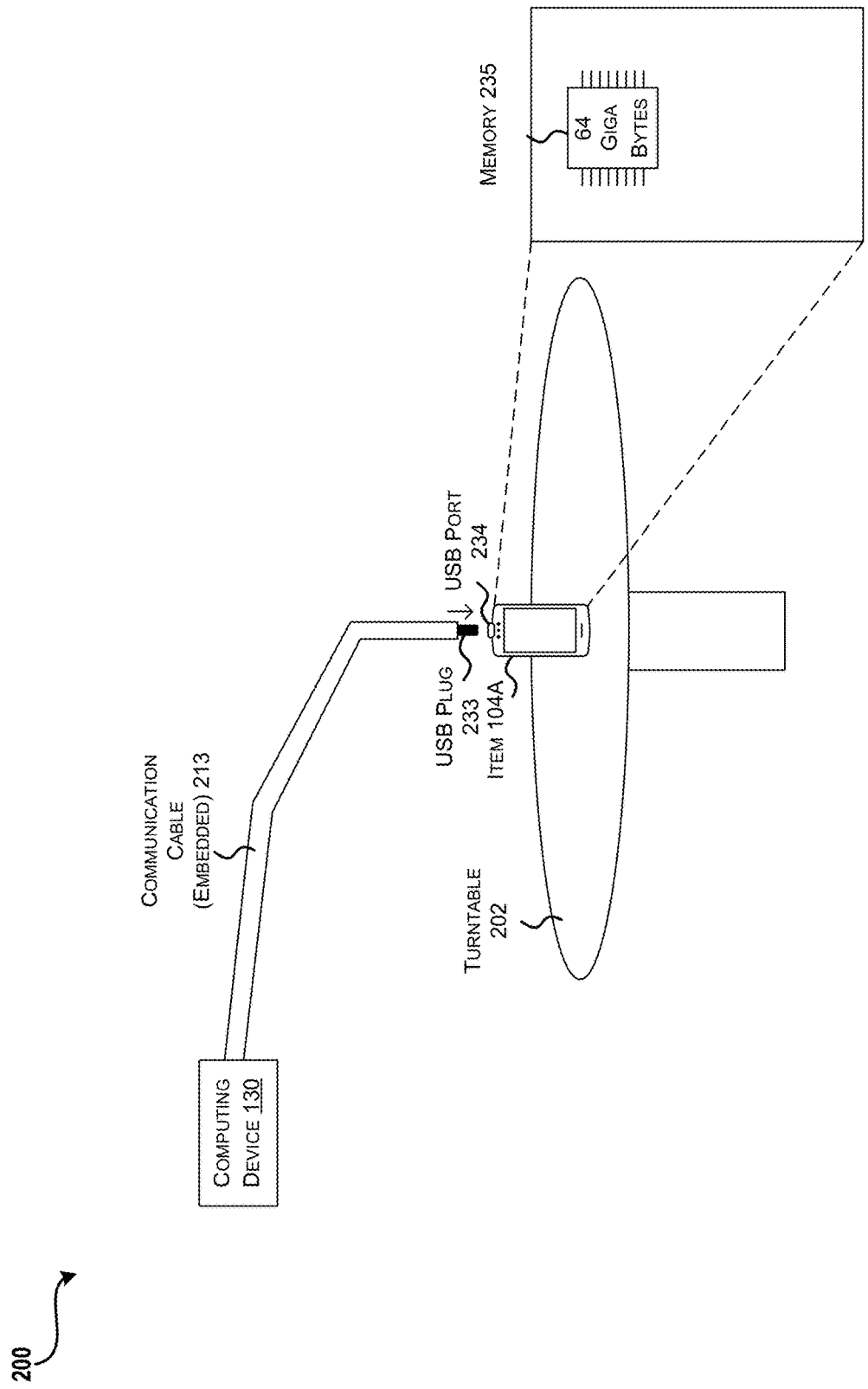
FIG. 2C is a block diagram showing aspects of the posting compartment as a communication cable is plugged into an item.

FIG. 2C is a block diagram showing aspects of the posting compartment 102 as a communication cable 213 embedded in item manipulation arm 216 is plugged into an item 104. In some embodiments, item manipulation arm 216 plugs USB plug 233 of communication cable 213 into USB port 234 of item 104A. The other end of communication cable 213 may be plugged into computing device 130, which may then interact with item 104A as described above in conjunction with FIG. 2A. Other types of communication interfaces are similarly contemplated, including Lightning cables, FireWire cables, and the like. Additionally or alternatively, item manipulation arm 216 may plug a power cable into item 104A, such that items that do not function under battery power may communicate with computing device 130. Additionally or alternatively, in addition to scanning item 104A with communication cable 213, item manipulation arm 216 may be used to navigate menus on item 104A by manipulating human-computer interfaces, such as touchscreens, keyboards, etc.

FIG. 3A is a diagram showing aspects of a posting 305A generated by a robotic selling assistant 100 according to one embodiment disclosed herein. FIG. 3A depicts browser application 302 as having been navigated to posting URL 304A of posting 305A.

Posting 305A includes posting title 306A, captured images 308A, supplemental information 310A, price information 312A, description 314A, and shipping information 316A.

While FIG. 3A depicts posting 305A as hosted in a web browser, any other type of application is similarly contemplated. For example, a purpose built application may be used to navigate to and display postings like 305A.

Posting title 306A may be derived from item identifier 220 and/or supplemental information 222. For example, posting title 306A may be derived from a product manual, manufacturer's description, etc. In FIG. 3A, posting title 306A describes a smart phone. As such, robotic selling assistant 100 may include the model (e.g. "Tornado Extreme") in addition to the generic description (e.g. "smart phone"). However, different types of items may include different attributes in the title. For example, antiques, or hand made items, for which no manufacturer or model number are known, may include a description of the material used to create the item. Title 306A may include any number and type of attributes of item 104, such as color, make and model, etc. Title 306A may also include the item's condition, e.g. "like new" or "used".

As discussed above, images 308A may include images 228 of item 104A taken from many different angles by camera(s) 206. Images 308A may also include images captured by UV camera 208 or IR camera 210, e.g. UV images that reveal physiological fluids or mold, or IR images that indicate an overheating or underheating condition of a piece of electronics that is operating outside of normal operating range. Images 308A may also include one or more images derived from supplemental information 310A, including images from a product manual associated with item 104.

Supplemental information 310A may include attributes associated with item 104. For example, supplemental information 310A may include a model number. The model number may have been stamped directly on item 104, or may have been inferred from a serial number, barcode, or other identifying information extracted from item 104. In part based on the model number, supplemental information may also include a manual that originally shipped with item 104A. Supplemental information 310A may also include an estimated condition of item 104A derived from the item's age, values obtained by sensors 204-214, etc.

Price information 312A may include a price suggested by robotic selling assistant 100. The price may be estimated in part based on the original asking price of item 104, the estimated condition of item 104, comparison to other instances of item 104 already for sale, and the like. Additionally, or alternatively, robotic selling assistant 100 may suggest a price based on prices of similar items sold within a defined period of time, e.g. prices of recently sold similar items. Similar items that are actively listed but unsold may also be used to suggest a price.

In some embodiments, robotic selling assistant 100 may identify attributes of item 104 that are "price influencing" attributes—attributes that when mentioned in the posting affect the selling price. In some embodiments, an attribute of an item is a physical property of the item, e.g. materials the item is manufactured from, a condition of the item, etc. Attributes may also include non-physical properties of the item, such as the brand, manufacturer, country of origin, etc. Attributes may be identified based on an analysis of postings of similar items, including an analysis of the title, description, keywords, pictures etc., to determine a correlation with final selling price. For example, an analysis of handbag postings may determine that a handbag made from real leather correlates with a higher final selling price than handbags made from faux leather. While maintaining an accurate description, robotic selling assistant 100 may select attributes for inclusion in the title of the posting that correlate with a higher final selling price. At the same time, robotic selling assistant 100 may minimize the impact of or completely avoid attributes associated with a lower selling price.

Description 314A may include a text-based description of item 104. The text-based description 314A may be automatically generated in part based on supplemental information 310A, such as a manufacturer's description. In the case of an electronics item such as smartphone 104A, description 314A may list specs, such as capacity, screen size, operating system version, etc.

Shipping information 316A may include a cost estimate based on packaging materials and shipping costs, which in turn may be derived from supplemental information 310A. For example, supplemental information 310A may include product dimensions, weight, fragility, and other factors that determine package size and shipping costs.

Figure 3B:
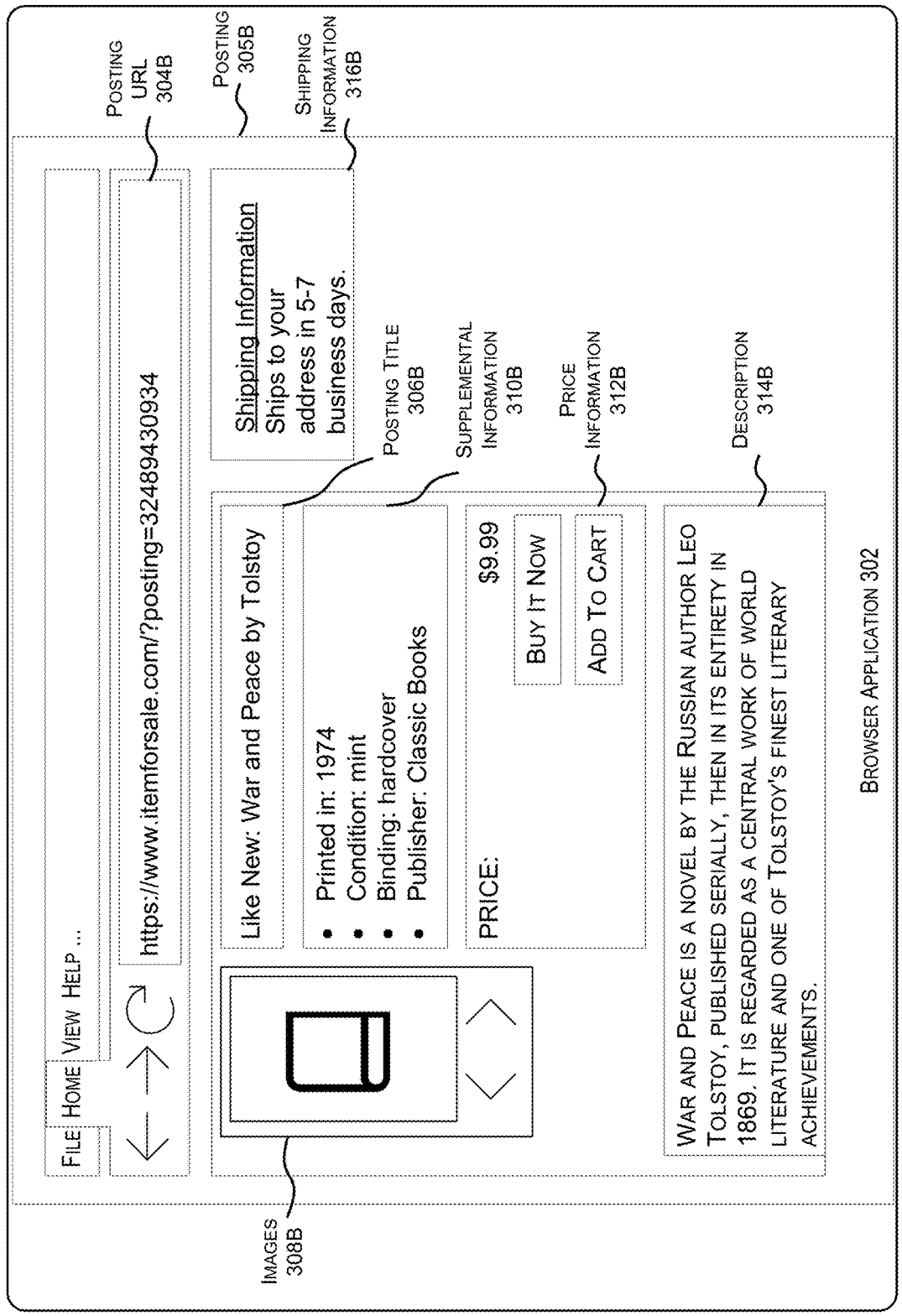
FIG. 3B is a diagram showing aspects of another posting generated by a robotic selling assistant according to one embodiment disclosed herein.

FIG. 3B is a diagram showing aspects of a posting 305B generated by a robotic selling assistant 100 according to one embodiment disclosed herein. Posting 305B includes posting title 306B, captured images 308B, supplemental information 310B, price information 312B, description 314B, and shipping information 316B.

Posting title 306B may be derived from item identifier 220 and/or supplemental information 222. In FIG. 3B, item 104B is a book, and so title 306B includes the condition of the book, the title, and the author. However, this is but one example—any other supplemental information may be included in posting title 306B, and different item types will include different portions of supplemental information.

As discussed above, images 308B may include images 228 of item 104B taken from many different angles by camera(s) 206. Images 308B may also include images captured by UV camera 208 or IR camera 210, e.g. UV images that reveal physiological fluids or mold. Images 308B may also include one or more images derived from supplemental information 310B, including images provided by a publisher of item 104B.

Supplemental information 310B may include attributes associated with item 104B. For example, supplemental information 310B may include an ISBN number. The ISBN number may have been stamped directly on item 104, or may have been inferred from identifying information extracted from item 104B. In part based on the ISBN number, supplemental information may also include comments or reviews associated with item 104B, e.g. comments or reviews created by customers, professional reviewers, etc. Supplemental information 310B may also include a condition of item 104B based on values obtained by sensors 206-214 as described above.

Price information 312B may include a price suggested by robotic selling assistant 100. The price may be estimated in part based on the original asking price of item 104B, the estimated condition of item 104B, comparison to other instances of item 104B already for sale, and the like.

Description 314B may include a text-based description of item 104B. The text-based description 314B may be automatically generated in part based on supplemental information 310A. In the case of a book such as item 104B, description 314B may include a summary of the book provided by the publisher, extracted from a community edited encyclopedia, etc. Description 314B may also include reviews of item 104B, star ratings, etc.

Shipping information 316B may include a cost estimate based on packaging materials and shipping costs, which in turn may be derived from supplemental information 310B. For example, supplemental information 310B may include product dimensions, weight, fragility, and other factors that determine package size and shipping costs.

Figure 4:
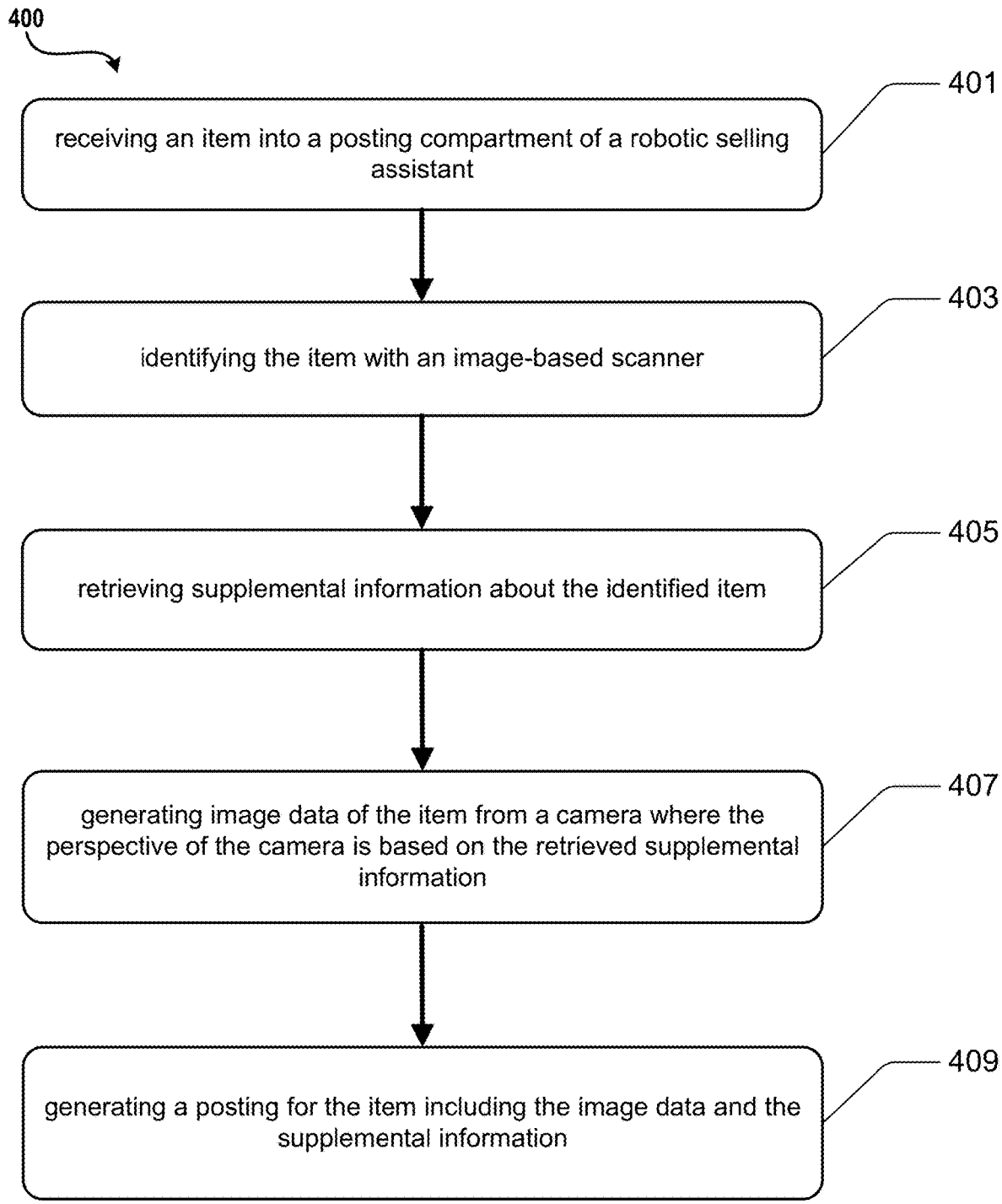
FIG. 4 is a flow diagram showing aspects of an illustrative routine, according to one embodiment disclosed herein.

FIG. 4 is a diagram illustrating aspects of a routine 400 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 400 begins at operation 401, which illustrates receiving an item into a posting compartment of a robotic selling assistant.

The routine 400 then proceeds to operation 403, which illustrates identifying the item with an image-based scanner.

The routine 400 then proceeds to operation 405, which illustrates retrieving supplemental information about the identified item.

The routine 400 then proceeds to operation 407, which generates image data of the item from a camera where the perspective of the camera is based on the retrieved supplemental information.

Next, operation 409 illustrates generating a posting for the item, where the posting includes the image data and the supplemental information.

Figure 5:
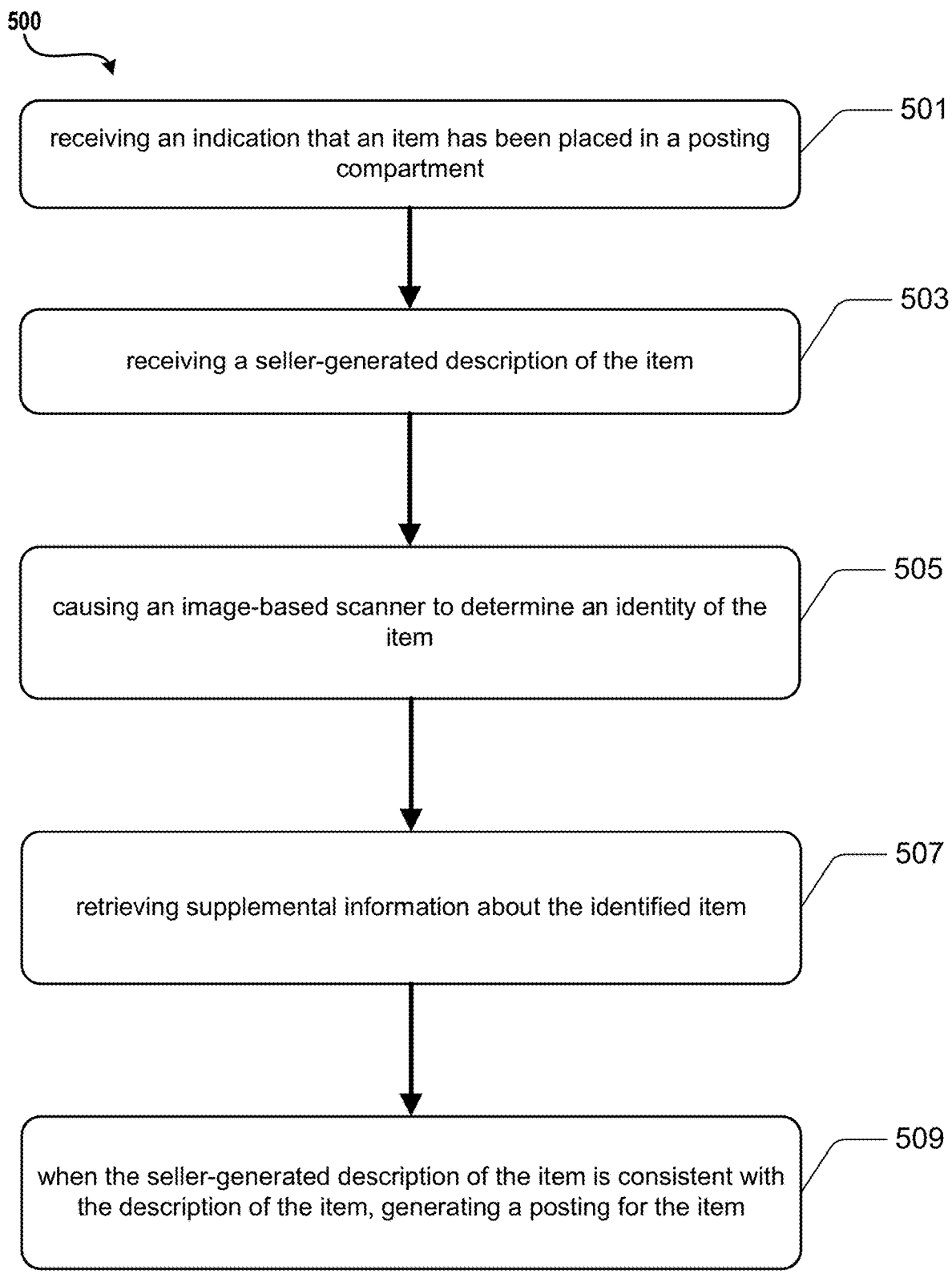
FIG. 5 is a flow diagram showing aspects of an illustrative routine, according to one embodiment disclosed herein.

FIG. 5 is a diagram illustrating aspects of a routine 500 for implementing some of the techniques disclosed herein.

The routine 500 begins at operation 501, which illustrates receiving an indication that an item has been placed in a posting compartment.

The routine 500 then proceeds to operation 503, which illustrates receiving a seller-generated description of the item.

The routine 500 then proceeds to operation 505, which illustrates causing an image-based scanner to determine an identity of the item.

The routine 500 then proceeds to operation 507, which illustrates retrieving supplemental information about the identified item.

Operation 509 illustrates generating a posting for the item when the seller-generated description of the item is consistent with the description of the item.

Figure 6:
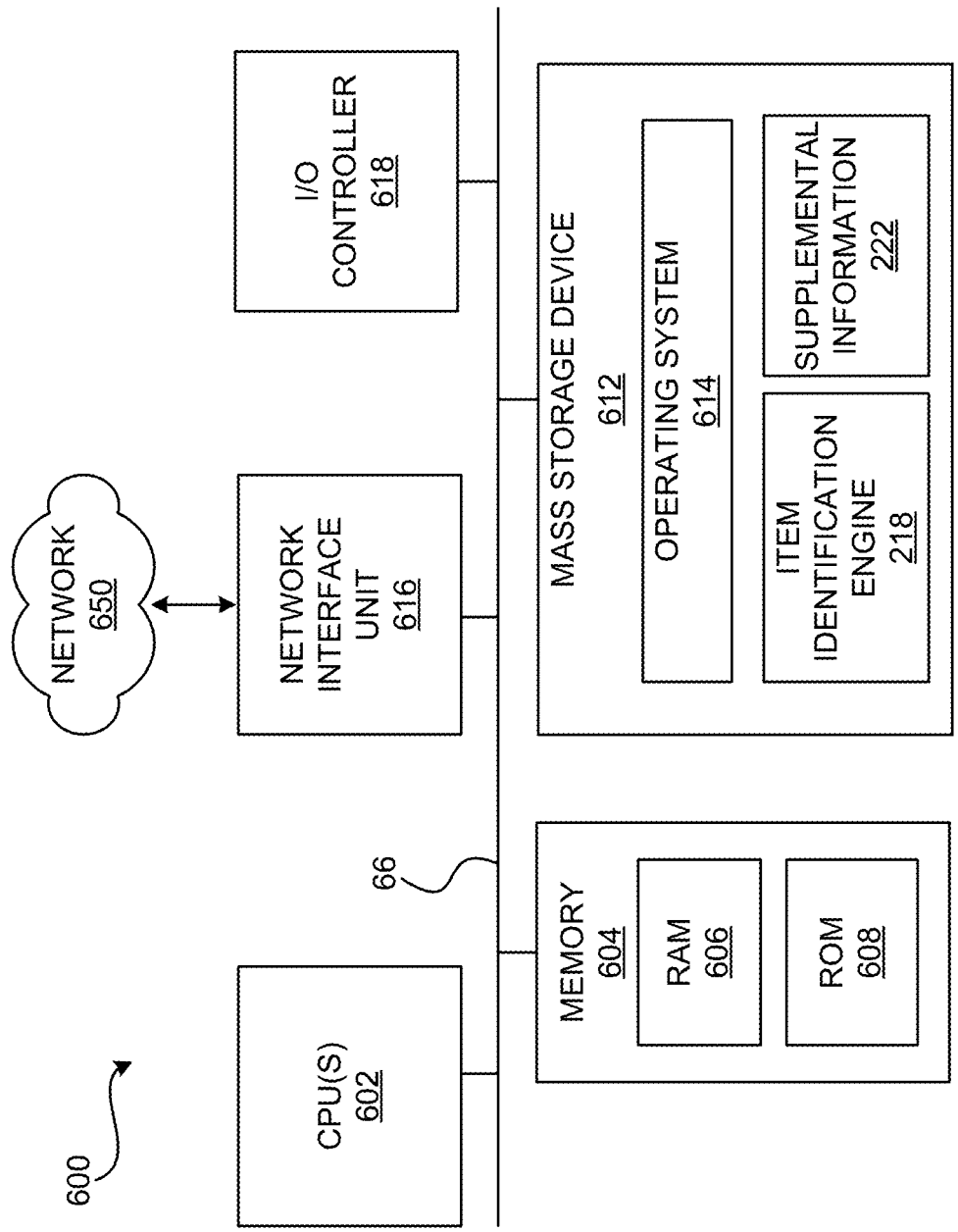
FIG. 6 is a computer architecture diagram illustrating aspects of an example computer architecture for a computer capable of executing the software components described herein.
Figure 7:
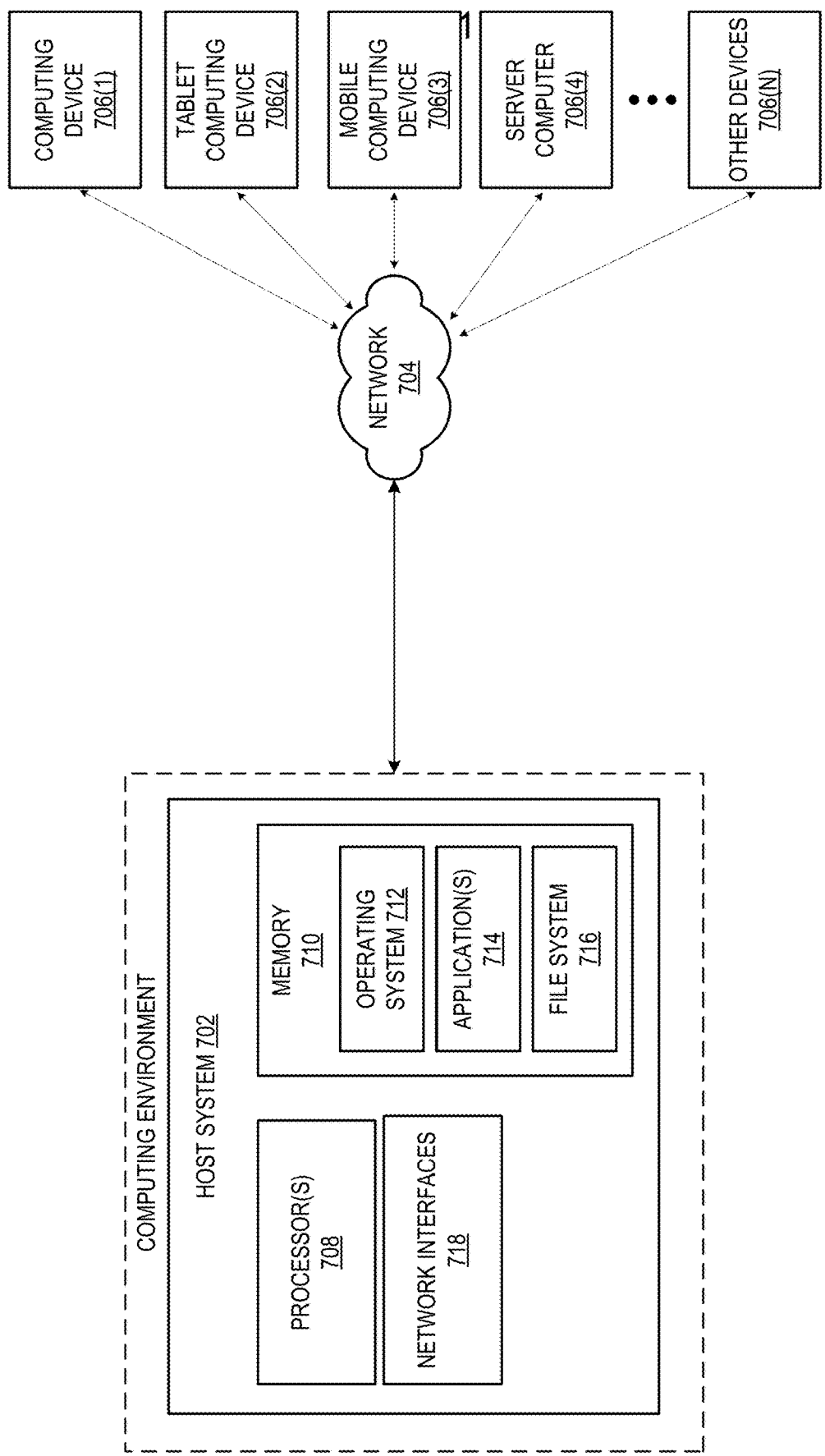
FIG. 7 is a data architecture diagram showing an illustrative example of a computer environment.

FIG. 6 shows an example computer architecture for a computer capable of providing the functionality described herein such as, for example, a computing device configured to implement the functionality described above with reference to FIGS. 1-5. Thus, the computer architecture 600 illustrated in FIG. 6 illustrates an architecture for a server computer or another type of computing device suitable for implementing the functionality described herein. The computer architecture 600 might be utilized to execute the various software components presented herein to implement the disclosed technologies.

The computer architecture 600 illustrated in FIG. 6 includes a central processing unit 602 ("CPU"), a system memory 604, including a random-access memory 606 ("RAM") and a read-only memory ("ROM") 608, and a system bus 66 that couples the memory 604 to the CPU 602. A firmware containing basic routines that help to transfer information between elements within the computer architecture 600, such as during startup, is stored in the ROM 608. The computer architecture 600 further includes a mass storage device 612 for storing an operating system 614, other data such as supplemental information 222, and one or more executable programs, such as item identification engine 218.

The mass storage device 612 is connected to the CPU 602 through a mass storage controller (not shown in FIG. 6) connected to the bus 66. The mass storage device 612 and its associated computer-readable media provide non-volatile storage for the computer architecture 600. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various implementations, the computer architecture 600 might operate in a networked environment using logical connections to remote computers through a network 650 and/or another network (not shown in FIG. 6). A computing device implementing the computer architecture 600 might connect to the network 650 through a network interface unit 616 connected to the bus 66. It should be appreciated that the network interface unit 616 might also be utilized to connect to other types of networks and remote computer systems.

The computer architecture 600 might also include an input/output controller 618 for receiving and processing input from a number of other devices, including a keyboard, mouse, or electronic stylus (not shown in FIG. 6). Similarly, the input/output controller 618 might provide output to a display screen, a printer, or other type of output device (also not shown in FIG. 6).

It should be appreciated that the software components described herein might, when loaded into the CPU 602 and executed, transform the CPU 602 and the overall computer architecture 600 from a general-purpose computing system into a special-purpose computing system customized to facilitate the functionality presented herein. The CPU 602 might be constructed from any number of transistors or other discrete circuit elements, which might individually or collectively assume any number of states. More specifically, the CPU 602 might operate as a finite-state machine, in response to executable instructions contained within the software modules disclosed herein. These computer-executable instructions might transform the CPU 602 by specifying how the CPU 602 transitions between states, thereby transforming the transistors or other discrete hardware elements constituting the CPU 602.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 might include other types of computing devices, including hand-held computers, embedded computer systems, personal digital assistants, and other types of computing devices known to those skilled in the art.

It is also contemplated that the computer architecture 600 might not include all of the components shown in FIG. 6, might include other components that are not explicitly shown in FIG. 6, or might utilize an architecture completely different than that shown in FIG. 6. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

FIG. 7 illustrates an example computing environment capable of executing the techniques and processes described above with respect to FIGS. 1-7. In various examples, the computing environment comprises a host system 702. In various examples, the host system 702 operates on, in communication with, or as part of a network 704.

The network 704 can be or can include various access networks. For example, one or more client devices 706(1) ... 706(N) can communicate with the host system 702 via the network 704 and/or other connections. The host system 702 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 702 can be provided by one or more servers that are executing as part of, or in communication with, the network 704. A server can host various services, virtual machines, portals, and/or other resources. For example, a can host or provide access to one or more portals, Web sites, and/or other information.

The host system 702 can include processor(s) 708 and memory 710. The memory 710 can comprise an operating system 712, application(s) 714, and/or a file system 716. Moreover, the memory 710 can comprise performance specifications, item attributes, pictures, and other data generated and consumed as described above with respect to FIGS. 1-7.

The processor(s) 708 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 710.

The memory 710 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 702 can communicate over the network 704 via network interfaces 718. The network interfaces 718 can include various types of network hardware and software for supporting communications between two or more devices.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGS. described herein, the operations of the routines are described herein as being implemented, at least in part, by an application, component, and/or circuit. Although the following illustration refers to the components of specified figures, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method implemented by a robotic assistant, the method comprising:
   receiving an item in a posting compartment;
   identifying the item with one or more image-based sensors;
   retrieving supplemental information about the item, wherein the supplemental information can identify a size and shape of the item and at least one performance specification;
   generating image data of the item from one or more cameras, wherein an angle, zoom level, and a distance of the one or more cameras in relation to the item to generate the image data are based on the size and the shape of the item; and
   generating a posting for the item, the posting comprising the image data and the supplemental information.

2. The method of claim 1, wherein the supplemental information is retrieved based on an identifier encoded in a barcode on the item.

3. The method of claim 1, wherein the posting compartment includes a turntable on which the item is placed, and wherein the one or more cameras take pictures of the item from different perspectives as the turntable rotates the item.

4. The method of claim 1, wherein a laser distance measure determines at least one of the size or the shape of the item as a turntable rotates the item.

5. The method of claim 1, wherein a customized package is created to ship the item in based on the size or the shape of the item.

6. The method of claim 1, wherein a laser distance measure attached to a gimbal is moved in three dimensions around the item to measure a second size of the item, and wherein the size of the item and the second size of the item are compared to verify an accuracy of the posting.

7. The method of claim 1, further comprising:
   autonomously plugging a communication cable into the item;
   retrieving additional supplemental information about the item over the communication cable; and
   including the additional supplemental information about the item in the posting.

8. A computer-readable storage medium having computer-executable instructions stored thereupon which, when executed by a processor of a computing device, cause the computing device to:
   receive an indication that an item was placed in a posting compartment of a robotic assistant;
   identify the item with one or more image-based sensors;
   retrieve supplemental information about the item, in which the supplemental information includes one or more materials that the item is made of, a weight of the item, and dimensions of the item;
   determine whether the supplemental information is accurate by comparing the weight of the item to a measured weight of the item and the dimensions of the item to dimensions of the item measured with sensors in the posting compartment;
   determine a condition of the item using the one or more image-based sensors in the posting compartment and based on the one or more materials that the item is made of; and
   generate a posting for the item, the posting describing the condition of the item.

9. The computer-readable storage medium of claim 8, wherein the weight of the item is derived from a scale in the posting compartment, wherein the dimensions of the item are determined based on one or more sensors in the posting compartment, and wherein the derived weight and the determined dimensions of the item are used to estimate a packaging cost.

10. The computer-readable storage medium of claim 8, wherein image data included in the posting is captured from different angles in conjunction with an item manipulation arm within the posting compartment that holds the item at the different angles in relation to one or more cameras.

11. The computer-readable storage medium of claim 8, wherein the robotic assistant receives a request to retrieve the item from a defined location, and wherein, in response to the request to pick up the item, the robotic assistant moves to the defined location to retrieve the item.

12. A method implemented by a robotic assistant, the method comprising:
    determining that an item was placed in a posting compartment of the robotic assistant;
    identifying the item with one or more image-based sensors of the posting compartment;
    retrieving supplemental information about the item, the supplemental information including one or more materials that the item is manufactured from, a weight of the item, and dimensions of the item;
    determining whether the supplemental information is accurate by comparing the weight of the item to a measured weight of the item and the dimensions of the item to dimensions of the item measured with sensors in the posting compartment;
    determining a condition of the item using at least the one or more image-based sensors of the posting compartment and based on the one or more materials that the item is manufactured from; and
    generating a posting for the item, the posting describing the condition of the item.

13. The method of claim 12, wherein the weight of the item is derived from a scale in the posting compartment, wherein the dimensions of the item are determined based on one or more sensors in the posting compartment, and wherein the derived weight and the determined dimensions of the item are used to estimate a packaging cost.

14. The method of claim 12, wherein image data included in the posting is captured from different angles in conjunction with an item manipulation arm within the posting compartment that holds the item at the different angles in relation to one or more cameras.

15. The method of claim 12, further comprising identifying one or more odors with one or more odor sensors of the posting compartment, and wherein the determining of the condition of the item is further based on the one or more odors.

16. The method of claim 12, wherein the one or more image-based sensors include an ultraviolet light sensor.

17. The method of claim 12, wherein the one or more image-based sensors include an infrared light sensor.

18. The method of claim 12, further comprising:
receiving a request to retrieve the item from a location; and responsive to the request to retrieve the item, moving the posting compartment of the robotic assistant to the location to retrieve the item.

19. The computer-readable storage medium of claim 8, wherein the condition of the item is determined by detecting whether the item is damaged based on images of an outside surface of the item captured from multiple angles.

20. The method of claim 12, wherein the condition of the item is determined by detecting whether the item is damaged based on images of an outside surface of the item captured from multiple angles.

* * * * *